United States Patent
Hoffmann et al.

(10) Patent No.: US 11,498,862 B2
(45) Date of Patent: Nov. 15, 2022

(54) OPTICAL FIBER DRAW FURNACE SYSTEM AND METHOD

(71) Applicant: CORNING INCORPORATED, Corning, NY (US)

(72) Inventors: Tammy Michelle Hoffmann, Wilmington, NC (US); John Michael Jewell, Wilmington, NC (US); Nikolaos Pantelis Kladias, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/155,201

(22) Filed: Jan. 22, 2021

(65) Prior Publication Data
US 2021/0230044 A1     Jul. 29, 2021

Related U.S. Application Data

(60) Provisional application No. 62/965,473, filed on Jan. 24, 2020.

(51) Int. Cl.
*C03B 37/029*     (2006.01)
*C03B 37/03*      (2006.01)

(52) U.S. Cl.
CPC .......... *C03B 37/029* (2013.01); *C03B 37/032* (2013.01); *C03B 2205/62* (2013.01); *C03B 2205/74* (2013.01)

(58) Field of Classification Search
None
See application file for complete search history.

(56) References Cited

U.S. PATENT DOCUMENTS

| 4,154,592 A | 5/1979 | Bailey |
| 6,381,990 B1 | 5/2002 | Ball et al. |
| 6,668,592 B1 | 12/2003 | Taru et al. |
| 6,735,983 B1 | 5/2004 | Taru et al. |
| 6,810,692 B2 | 11/2004 | Taru et al. |
| 2004/0089025 A1 | 5/2004 | Kuwahara et al. |
| 2010/0207333 A1 | 8/2010 | Tetsuya |
| 2014/0096566 A1 | 4/2014 | Tetsuya |

(Continued)

FOREIGN PATENT DOCUMENTS

| CN | 1500754 A | 6/2004 |
| CN | 1665749 A | 9/2005 |
| CN | 102643009 A | 8/2012 |

(Continued)

OTHER PUBLICATIONS

JP09-20528A EPO Machine Translation Performed Mar. 22, 2022. (Year: 2022).*

(Continued)

*Primary Examiner* — Lisa L Herring
(74) *Attorney, Agent, or Firm* — Amy T. Lang

(57) ABSTRACT

An optical fiber draw system and method of operating thereof. The method includes positioning a downfeed handle for supporting an optical fiber preform within a furnace such that the downfeed handle is movable within the furnace. The method further includes operating one or more heating elements to thermally heat at least a portion of an upper muffle extension disposed within the furnace, the one or more heating elements being moveable with the downfeed handle.

16 Claims, 13 Drawing Sheets

(56) References Cited

U.S. PATENT DOCUMENTS

| | | |
|---|---|---|
| 2015/0321944 A1 | 11/2015 | Yamazaki et al. |
| 2016/0002090 A1 | 1/2016 | Okazaki et al. |

FOREIGN PATENT DOCUMENTS

| | | | | |
|---|---|---|---|---|
| CN | 102906040 | A | 1/2013 | |
| CN | 103819084 | A | 5/2014 | |
| CN | 104556677 | A | 4/2015 | |
| CN | 104628250 | A | 5/2015 | |
| CN | 104981438 | A | 10/2015 | |
| EP | 0386756 | A1 | 9/1990 | |
| EP | 0416614 | A1 | 3/1991 | |
| EP | 2022766 | A2 | 2/2009 | |
| GB | 2361472 | A | 10/2001 | |
| JP | 01-130032 | A | 5/1989 | |
| JP | 04-228420 | A | 8/1992 | |
| JP | 05-170038 | A | 7/1993 | |
| JP | 09-002832 | A | 1/1997 | |
| JP | 09-020528 | A | 1/1997 | |
| JP | 09-202637 | A | 8/1997 | |
| JP | 10-130032 | A | 5/1998 | |
| JP | 2000-053440 | A | 2/2000 | |
| JP | 2000-154034 | A | 6/2000 | |
| JP | 2002-068773 | A | 3/2002 | |
| JP | 2004-142988 | A | 5/2004 | |
| JP | 2011-046563 | A | 3/2011 | |
| JP | 2013-151393 | A | 8/2013 | |
| JP | 2013-151395 | A | 8/2013 | |
| JP | 2013151395 | A * | 8/2013 | ........... C03B 37/029 |
| JP | 2015-093815 | A | 5/2015 | |
| RU | 2335465 | C2 | 10/2008 | |
| WO | 99/51534 | A1 | 10/1999 | |
| WO | 2018/022316 | A1 | 2/2018 | |

OTHER PUBLICATIONS

International Search Report and Written Opinion of the International Searching Authority; PCT/US2021/012228; dated Apr. 1, 2021, 10 pages; European Patent Office.

Boll et al., "Large Optical Fiber Draw Furnace Developments", Proc. 59th ICWS/IICIT, 2010, pp. 335-339.

Korpela et al., "Stability of the conduction regime of natural convection in a tall vertical annulus", J. Fluid Mech., vol. 99, part 4, 1980, pp. 725-738.

* cited by examiner

OPTICAL FIBER DRAW FURNACE SYSTEM AND METHOD

This application claims priority under 35 USC § 119(e) from U.S. Provisional patent Application Ser. No. 62/965,473 filed on Jan. 24, 2020 which is incorporated by reference herein in its entirety.

FIELD OF THE DISCLOSURE

The present invention is generally directed to systems and methods for operating an optical fiber draw furnace, and more particularly relates to systems and methods for operating an optical fiber draw furnace while heating a downfeed handle within the draw furnace.

BACKGROUND OF THE DISCLOSURE

Optical fibers are generally manufactured to include an inner glass core surrounded by a glass cladding and multiple layers of coatings to provide sufficient bending and damage resistance. Conventional techniques and manufacturing processes for producing optical fibers include drawing an optical fiber from a preform. The preform is formed of consolidated silica glass, which includes a series of concentric regions of silica glass that differ in the level or type of dopant. Control of the spatial distribution, concentration, and/or type of dopant in the preform creates regions that differ in refractive index. These differences in refractive index define different functional regions in the produced optical fiber (e.g. core vs. cladding, low index depressions, tailored index profiles).

Drawing of the preform is typically performed in a draw furnace and involves melting and stretching the preform to achieve a target optical fiber diameter. Various properties, including furnace temperature, preform position, and pulling speed, are controlled in order to produce an optical fiber with a constant diameter. For example, temporal variation in the temperature of the furnace can cause variation in the cooling rate of the preform during the drawing procedure, resulting in an uneven and irregular optical fiber diameter.

Furthermore, unsteady convection of gases within the draw furnace can lead to an uneven and irregular optical fiber diameter. Inert process gas is typically introduced into an upper portion of the draw furnace in order to prevent ambient air from entering the furnace. Ambient air can react with components of the draw furnace, causing unwanted oxidation. But, flow instabilities in the process gas at the upper portion of the furnace can affect uniform drawing of the preform. More specifically, flow instabilities in the upper, not actively heated, portion of the furnace are propagated downward in the furnace, towards the neckdown region of the preform. This can affect the heat transfer between the process gas and the neckdown region of the preform, which in turn leads to fluctuations in cooling rate of the preform, resulting in diameter fluctuations of the drawn optical fiber.

Conventional inert process gases include nitrogen and argon. But, these gases can cause the undesired flow instabilities in the upper portion of the draw furnace. Helium gas is known to reduce any unsteady convection in a draw furnace and, thus, has been used in place of nitrogen and argon to provide more uniform diameters in the drawn optical fibers. However, helium is a nonrenewable resource recovered as a byproduct from natural gas wells. The price of helium is projected to increase in the future, thus increasing the need to use other gases in the draw furnace. There is therefore a need to provide systems and methods for operating a draw furnace without having to necessarily use helium while still maintaining a steady gas convection within the draw furnace.

SUMMARY OF THE DISCLOSURE

According to one embodiment, a method of operating an optical fiber draw furnace is provided. The method includes positioning a downfeed handle for supporting an optical fiber preform within a furnace such that the downfeed handle is movable within the furnace. The method also includes the step of operating one or more heating elements to thermally heat at least a portion of an upper muffle extension disposed within the furnace, the one or more heating elements being moveable with the downfeed handle.

According to another embodiment, an optical fiber draw furnace system is provided. The system includes a muffle comprising an upper muffle extension and forming an inner cavity. The system also includes a downfeed handle and an upper heater. The downfeed handle is moveably positioned within the inner cavity. Furthermore, the upper heater includes one or more heating elements moveable with the downfeed handle within the inner cavity.

DETAILED DESCRIPTION

Figure 1:
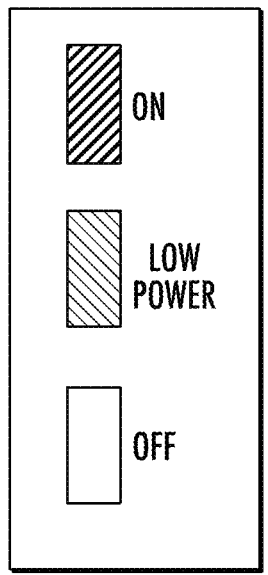
FIG. 1 is a schematic diagram illustrating a draw furnace assembly according to embodiments of the present disclosure.
Figure 1:
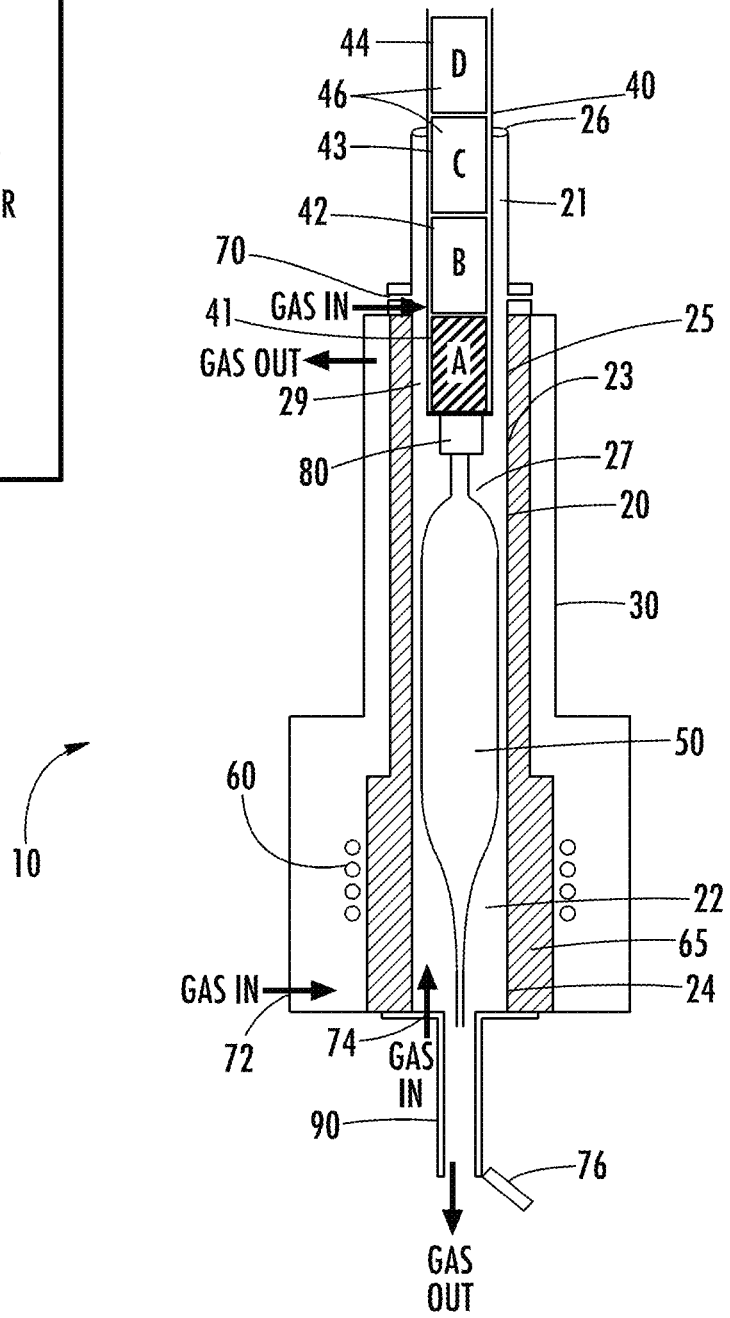

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

It is also important to note that the construction and arrangement of the elements of the disclosure, as shown in the exemplary embodiments, is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel and nonobvious teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present disclosure. Other substitutions, modifications, changes, and omissions may be made in the design, operating conditions, and arrangement of the desired and other exemplary embodiments without departing from the spirit of the present disclosure.

Reference will now be made in detail to the present preferred embodiments of the disclosure, examples of which are illustrated in the accompanying drawings. Whenever possible, the same reference numbers will be used throughout the drawings to refer to the same or like parts.

Referring now to FIG. 1, an exemplary optical fiber draw furnace system is shown generally designated by reference numeral 10, according to one example. Draw furnace 10 includes a muffle 20 disposed within an outer can 30. A downfeed handle 40 is moveably positioned within a handle cavity of muffle 20 to support an optical fiber preform 50. As discussed further below, an upper heater comprised of one or more heating elements is coupled to and moveable with downfeed handle 40. The heating elements help to provide a more uniform temperature and steady convection of gases within draw furnace 10.

Muffle 20 comprises a first end portion 24 and a second end portion 25, as shown in FIG. 1. Second end portion 25 forms an upper muffle extension 23, which extends downward along a predetermined length of muffle 20. A top hat 21 is positioned above upper muffle extension 23 and provides sealing and motion capabilities, as is known in the art. As shown in FIG. 1, muffle 20 and top hat 21 form an inner cavity 27 through which downfeed handle 40 is moveably disposed. As discussed further below, cavity 27 includes a furnace cavity 22 at a first end of cavity 27. Furthermore, a handle cavity 29 may form a portion of cavity 27 that is disposed between downfeed handle 40 and muffle 20. As downfeed handle 40 moves within cavity 27, handle cavity 29 may comprise different portions of cavity 27. For example, as downfeed handle 40 moves lower within cavity 27 so that a greater portion of downfeed handle 40 is disposed within muffle 20, handle cavity 29 also increases in length. An elastomer seal 26 may provide an airtight connection between downfeed handle 40 and upper muffle extension 23.

Muffle 20 and/or upper muffle extension 23 may be composed of a refractory material and/or a refractory metal such as, for example, graphite, zirconia, binders, alumina, mullite, quartz, silicon carbide, silicon nitride, and/or combinations thereof. Therefore, muffle 20 and/or upper muffle extension 23 may be formed of carbon, which can react with ambient air and combust. Additionally, muffle 20 and upper muffle extension 23 may be a single component or formed of two or more separate components. As shown in FIG. 1, muffle 20 and upper muffle extension 23 may have a substantially uniform inner diameter. It is also contemplated that muffle 20 and upper muffle extension 23 may have different inner diameters. In some embodiments, the inner diameter of muffle 20 and/or upper muffle extension 23 may vary along the length of the component.

A lower heater 60 is disposed within outer can 30 adjacent to the first end portion 24 of muffle 20. Lower heater 60 may be thermally coupled to muffle 20 to create a hot zone within furnace cavity 22. The hot zone may have a temperature of from about 1800° C. to about 2100° C. In some embodiments, the hot zone may have a temperature of about 1800° C., about 1900° C., about 2000° C., or about 2100° C., or any range having any two of these values as endpoints. As will be explained in greater detail below, the heat of the hot zone is sufficient to decrease the viscosity of preform 50. In some embodiments, lower heater 60 may comprise an induction coil.

Furthermore, muffle 20 and/or upper muffle extension 23 are configured to retain heat within draw furnace 10, as well as protect other components from excess temperatures. For example, muffle 20 and/or upper muffle extension 23 may have insulating properties sufficient to maintain the elevated temperature of the hot zone within furnace cavity 22. It is also contemplated that, for example, an insulation 65 surrounds muffle 20. As shown in FIG. 1, insulation 65 may be disposed between muffle 20 and the induction coil of lower heater 60 and disposed between upper muffle extension 23 and outer can 30. Therefore, insulation 65 may extend in length from lower heater 60 to upper muffle extension 23 such that it is disposed around upper muffle extension 23. In some embodiments, insulation 65 is a graphite insulation.

Although muffle 20 and/or upper muffle extension 23 may generally be good insulators, oxidation may still occur at elevated temperatures. Therefore, one or more process gases may be inserted or injected into draw furnace 10 to prevent oxidation of these components. As discussed further below, the process gases may include an inert gas such as, for example, nitrogen, argon, helium, and/or a combination of these gases.

Outer can 30 may include one or more gas inlet ports to inject the process gas into cavity 27. For example, as shown in FIG. 1, outer can 30 includes a first gas inlet port 70, a second gas inlet port 72, and a third gas inlet port 74. First gas inlet port 70 is disposed in upper muffle extension 23, second gas inlet port 72 is disposed in the outer can 30 near lower heater 60, and third gas inlet ports 74 is disposed at a bottom of muffle 20. The process gas may be injected between an outer wall of muffle 20 and an inner wall of can 30. The process gas may also be injected in cavity 27, as shown in FIG. 1. As discussed further below, the process gas is injected into draw furnace 10 to ensure that ambient air does not enter draw furnace 10 during a drawing procedure. Therefore, oxygen from the ambient air is prevented from reacting with, for example, the carbon of muffle 20.

Preform 50 may be attached to and hung from downfeed handle 40 using a support member 80. It is contemplated that support member 80 is a component of downfeed handle 40, or is a separate component coupled to downfeed handle 40. Support member 80 may have substantially the same outer diameter as downfeed handle 40. Therefore, a gap between an outer diameter of downfeed handle 40 and an inner diameter of muffle 20 may be substantially equal to a gap between an outer diameter of support member 80 and the inner diameter of muffle 20. Support member 80 is configured to support preform 50. In some embodiments, support member 80 is a piece of glass welded to downfeed handle 40. Additionally or alternatively, support member 80 may include a slot to which preform 50 is attached. However, it is also contemplated that any suitable configuration may be used to attach preform 50 to downfeed handle 40.

Downfeed handle 40 may be composed of, for example, quartz glass, graphite, silicon nitride, silicon carbide or silicon carbide coated graphite, and downfeed handle 40 has an outer diameter smaller than an inner diameter of muffle 20. Thus, downfeed handle 40 (along with support member 80) is moveable within muffle 20 and top hat 21 along a longitudinal direction of these components (e.g., up and down). Additionally, downfeed handle 40 (along with support member 80) may be moveable within muffle 20 and top hat 21 in a radial direction of these components (e.g., left and right; front and back) and may be rotatable within these components. Preform 50, when attached to downfeed handle 40, may move with downfeed handle 40 within muffle 20 and top hat 21. For example, during a drawing process, downfeed handle 40 may move longitudinally within cavity 27 as preform 50 is consumed. As shown in FIGS. 1-4, downfeed handle 40 moves along a length of muffle 20 during a drawing process.

As preform 50 moves with downfeed handle 40 within muffle 20 and is lowered towards lower heater 60, an optical fiber may be drawn therefrom. Preform 50 may be composed of any well-known glass or other material and may be doped suitable for the manufacture of optical fibers. In some embodiments, preform 50 includes a core and a cladding. As preform 50 reaches the hot zone of lower heater 60, the viscosity of preform 50 is lowered such that an optical fiber may be drawn from preform 50. As preform 50 is continuously consumed during the drawing process, downfeed handle 40 may be continuously lowered such that new portions of preform 50 are exposed to the hot zone created by lower heater 60. The optical fiber is drawn from preform 50 out through a bottom of draw furnace 10 and may be wound onto a spool. In some embodiments, the optical fiber has a diameter of about 125 microns.

As discussed above, process gas is injected into muffle 20 during the drawing of preform 50. More specifically, during the drawing process, a door 76 is opened and process gas is injected into cavity 27 through gas inlet ports 70 and/or 72. The process gas injected into first gas inlet port 70 flows down through cavity 27, along the length of preform 50 and through furnace cavity 22, and into a lower muffle extension 90. Then the process gas exits through door 76. This flow path of the process gas is used to prevent ambient air from entering muffle 20 during the drawing process.

Gas inlet port 72 is used when lower heater 60 is powered on to heat preform 50. Process gas injected into gas inlet port 72 may flow upward within outer can 30 and exit draw furnace 10 near second end portion 25 of muffle 20. The process gas injected into gas inlet port 72 may be used as a purge gas to ensure that air is not present in outer can 30, which could react with insulation 65.

Furthermore, process gas is injected into gas inlet port 74 during loading and unloading procedures of preform 50. During these procedures, door 76 is closed and the process gas injected into gas inlet port 74 flows upward within cavity 27. This prevents air from entering a top portion of draw furnace 10 during the loading and unloading procedures.

In traditional draw furnace systems, the process gas is subject to flow instabilities as it flows within a draw furnace during a drawing procedure. As discussed above, such flow instabilities in the process gas can cause an uneven and irregular diameter in the drawn optical fiber. The flow instabilities arise from unsteady natural convection due to density stratification in the muffle cavity and due to the flow of the inert gas, which are propagated down through the muffle. These flow instabilities ultimately affect the heat transfer between the process gas and a draw root of an optical fiber preform. More specifically, the flow instabilities are manifested as temperature variations, pressure variations, and mass flow variations that are translated to the draw root and cause changes in viscosity of the preform. The temperature, pressure, and mass flow variations lead to fluctuations in the heating and cooling of the draw root, resulting in fluctuations of the diameter of the optical fiber drawn from the preform (e.g., due to changes in the amount of material which may be pulled from the optical fiber preform for a given speed and tension).

The flow instabilities, or unsteadiness, of the process gas may be quantified by a Grashof (Gr) number. The Gr number can be interpreted physically as the ratio of the buoyancy forces to the viscous forces of a gas system. When buoyancy forces become significantly larger than the viscous forces, flow becomes unstable and temporally-variant. The Grashof number is expressed numerically by equation (1):

$$Gr = \frac{g\beta L_c^3 \Delta T}{v^2} \qquad (1)$$

where, g is the gravitational acceleration, β is the coefficient of thermal expansion of the process gas, $L_c$ is the characteristic length (e.g., the length of the space in which the gas is disposed), ΔT is the temperature difference (e.g. as measured proximate the draw root of the optical fiber preform) and v is the kinematic viscosity of the process gas.

As discussed above, some draw furnaces may use helium because helium has a high kinematic viscosity. As can be seen from equation (1), a high kinematic viscosity of the process gas may lead to a lower Grashof number, which results in steady, time-invariant natural convection flow. Stated another way, process gases with higher kinematic viscosity resist unsteady buoyancy-driven flow. Furthermore, process gases with lower convective flow are less likely to cause unsteady flow behavior in a cavity of a muffle. Thus, the higher the kinematic viscosity of the process gas, the more resistant to buoyancy-driven convective flow in the process gas, thus decreasing or preventing unsteady flow instabilities in the muffle. Generally, a Grashof number of from about 7,000 or less, 8,000 or less, 9,000 or less, 10,000 or less, 11,000 or less, or 12,000 or less results in stable, time-invariant flow while a Grashof number of greater than about 13,000 results in unsteady, time-variant flow.

Referring to FIG. 1, an upper heater comprised of one or more heating elements 46 may be coupled to downfeed handle 40 to adjust the temperature difference in muffle 20 to reduce the Grashof number and to promote stable flow of the process gas, thereby reducing diameter variation in the drawn optical fiber. Thus, the one or more heating elements 46 may allow the use of process gases other than helium while still obtaining a desirably low Grashof number and stable flow. For example, heating elements 46 in draw furnace 10 may provide a Grashof number in the range of about 800 to about 1200 when using either argon or nitrogen as the process gas.

Heating elements 46 may include, for example, wound resistance heaters, band heaters, and/or immersion/bar heaters, as is well known in the art.

As shown in FIG. 1, heating elements 46 may be powered (i.e., turned to an on position) to form different heating zones on downfeed handle 40. For example, different heating elements are powered to form a first heating zone 41, a second heating zone 42, a third heating zone 43, and a fourth heating zone 44 of downfeed handle 40. Although the embodiment of FIG. 1 shows four heating zones, it is also contemplated that more or less heating zones may be used. For example, heating elements 46 may form, for example, one, two, five, six, seven, eight, or ten heating zones. Each heating zone may be heated and powered on independently from the other heating zones.

The zones 41, 42, 43, 44 may be disposed on an inner surface of downfeed handle 40 and extend along an entire inner circumference of downfeed handle 40. However, it is also contemplated that the zones may extend for less than the entire inner circumference of downfeed handle 40. Furthermore, zones 41, 42, 43, 44 may each have a length of about 8 in. to 12 in. One or more zones may be the same or different size in length as one or more other zones.

Heating elements 46 may heat one or more heating zones 41, 42, 43, 44 of downfeed handle 40, which in turn heats the process gas disposed within handle cavity 29. As discussed above, handle cavity 29 is the portion of cavity 27 that is disposed between downfeed handle 40 and muffle 20. Handle cavity 29 may comprise different portions of cavity 27 as downfeed handle 40 moves within draw furnace 10. The heating of the process gas disposed in handle cavity 29 may then heat a portion of upper muffle extension 23 that surrounds the heated downfeed handle 40 (and, therefore, that surrounds handle cavity 29). Thus, heating elements 46 heat the portion of upper muffle extension 23 that surrounds the heated downfeed handle 40.

The heating of the process gas disposed within handle cavity 29 increases the temperature of the process gas, which reduces temperatures gradients in both vertical and radial directions and increases the kinematic viscosity of the process gas. Such reduction of temperature gradients and increase of the kinematic viscosity results in increased stability of the flow of the process gas. As discussed above, flow instabilities in a draw operation may arise from the unsteady, buoyancy-driven flow of the process gas. The heat from downfeed handle 40 reduces/prevents such flow instabilities in draw furnace 10. Helium can then be replaced with argon or nitrogen as the process gas.

The temperature of the process gas in handle cavity 29 may be increased by about 450 to 750° C. due to heating elements 46. As shown in FIG. 1, insulation 65 around upper muffle extension 23 may help to maintain the increased gas temperature within handle cavity 29.

As shown in FIG. 1, heating elements 46 may be disposed inside of (e.g., on an inner wall surface) of downfeed handle 40. Thus, heating elements 46 are disposed radially inward of muffle 20 (including upper muffle extension 23) and of outer can 30. However, it is also contemplated that heating elements 46 may be disposed outward of downfeed handle 40 and/or muffle 20. In some embodiments, heating elements 46 may be disposed on an outer wall surface of downfeed handle 40 or embedded within the walls of downfeed handle 40. Heating elements 46 may be disposed anywhere on draw furnace 10 such that they are able to heat the process gas in the annular space between downfeed handle 40 and upper muffle extension 23 to reduce temperature gradients of the process gas. However, providing heating elements 46 on downfeed handle 40, rather than on a wall of muffle 20, provides the benefits of reducing power consumption due to a reduction in heat loss to the upper can, reducing design constraints by simplifying power and thermocouple wiring constraints, simplifying the sealing design of the muffle, and allowing heating of the handle to be utilized without modifying the furnace proper. Heating elements 46 may comprise a plurality of heating elements vertically positioned along a length of downfeed handle 40.

Heating elements 46 may be coupled to downfeed handle 40 such that heating elements 46 are moveable with downfeed handle 40 within muffle 20. Heating elements 46 may also sequentially heat zones 41, 42, 43, 44. For example, and as discussed further below, heating elements 46 may sequentially heat the zones as downfeed handle 40 (and, thus, heating elements 46) move longitudinally within muffle 20.

In some embodiments, heating elements 46 may only heat a portion of downfeed handle 40 that is disposed within upper muffle extension 23. Thus, a portion of downfeed handle 40 that is disposed exterior of upper muffle extension 23 (for example, within top hat 21) may not be heated by heating elements 46 even when at least some heating elements 46 are powered in an on position. This portion of downfeed handle 40 that was initially exterior of upper muffle extension 23, and not heated, may become heated by heating elements 46 as downfeed handle 40 moves downward within muffle 20 (i.e., towards lower heater 60) such that this portion of downfeed handle 40 is now disposed within upper muffle extension 23.

The portion(s) of downfeed handle 40 that are heated by heating elements 46 may be heated to a temperature ranging from about 200° C. to about 1200° C., from about 400° C. to about 1000° C., from about 600° C. to about 900° C., from about 700° C. to about 850° C., or about 800° C. Therefore, each zone 41, 42, 43, 44 of downfeed handle 40 may be separately and independently heated to a temperature within these disclosed ranges. One or more zones may be heated to a different temperature than one or more other zones. It is also contemplated that all zones 41, 42, 43, 44 are heated to the same temperature.

In some embodiments, one or more zones 41, 42, 43, 44 may be heated with a temperature gradient in the particular zone. Thus, for example, first zone 41 may be heated such that a top portion of the zone (further from lower heater 60) is heated to a higher temperature than a bottom portion of the zone (closer to lower heater 60) with a gradient provided between these two portions.

A control unit (not shown) may be coupled to heating elements 46 in order to monitor and regulate the temperature of each zone 41, 42, 43, 44 and the temperature of the process gas within handle cavity 29. For example, one or more sensors, such as thermocouples, may be coupled to the control unit to monitor and regulate the temperatures. The sensors may help to provide closed loop temperature control and thermal temperature gradient management.

As downfeed handle 40 moves within muffle 20 closer to lower heater 60, zones 41, 42, 43, 44 may be sequentially heated by heating elements 46. The sequential heating of the zones may occur as more and more portions of preform 60 are consumed by the drawing process. For example, in a first position of downfeed handle 40, the heating elements 46 may be in an off position such that none of the zones 41, 42, 43, 44 are heated. The first position may be used, for example, during loading and unloading of preform 50. In this first position, each of zones 41, 42, 43, 44 may be disposed exterior of upper muffle extension 23.

In one embodiment, heating elements 46 may heat first zone 41 after downfeed handle 40 is lowered to a second position within cavity 27 such that first zone 41 is disposed, at least in part, within upper muffle extension 23. At this time, the remaining zones 42, 43, 44 are each not heated by heating elements 46 and are disposed, at least in part, exterior of upper muffle extension 23. FIG. 1 depicts the second position of downfeed handle 40 in which zone 41 is heated by heating elements 46. As shown in FIGS. 1-4, first zone 41 may be disposed closest to lower heater 60 (when downfeed handle 40 is disposed within muffle 20) of all the zones.

Figure 2:
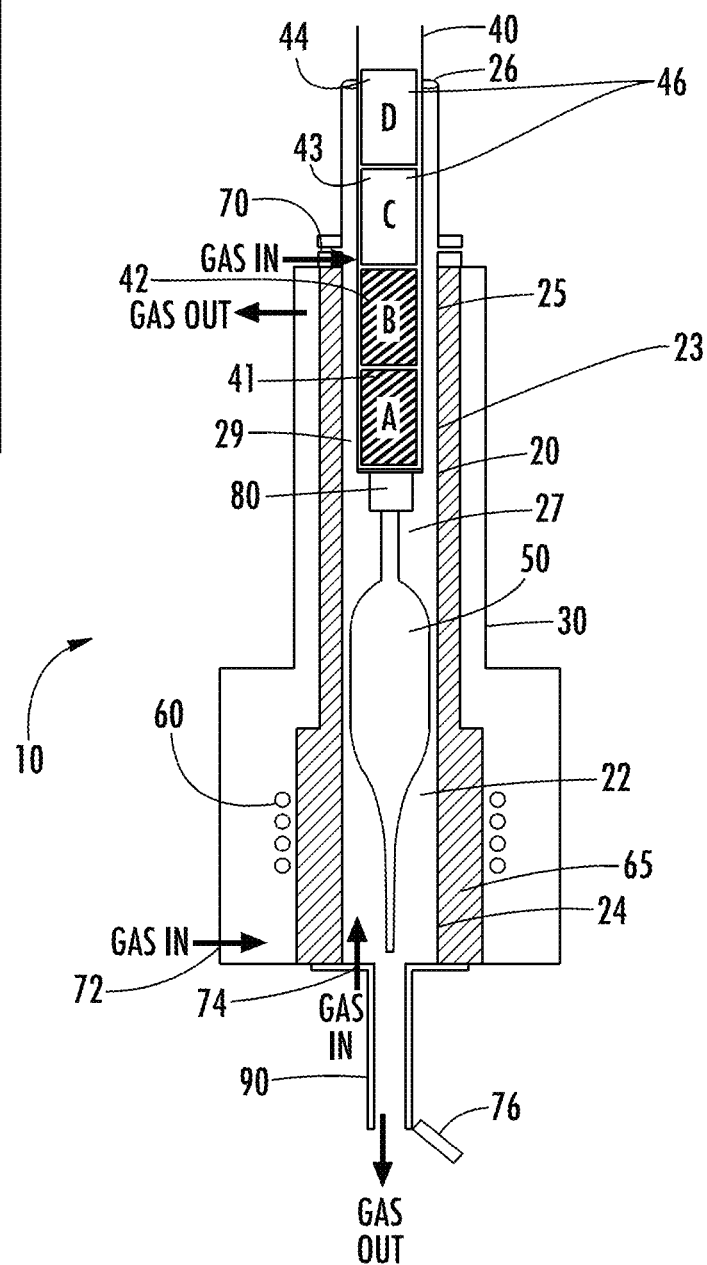
FIG. 2 is a schematic diagram illustrating the draw furnace assembly of FIG. 1 in another position.

Downfeed handle 40 may then move from the second position to a third position by moving lower (e.g., relatively closer to lower heater 60) such that both first zone 41 and second zone 42 are disposed, at least in part, within upper muffle extension 23. At this time, second zone 42 may now be heated. Therefore, second zone 42 is heated after heating first zone 41. Downfeed handle 40 may move from the second position to the third position simultaneously as additional preform 50 is consumed by the drawing process. At the time of the third position of downfeed handle 40, the remaining zones 43, 44 are each not heated by heating elements 46 and are disposed, at least in part, exterior of upper muffle extension 23. FIG. 2 depicts the third position of downfeed handle 40 in which zones 41, 42 are both heated by heating elements 46. As also shown in FIGS. 1-4, first zone 41 is located relatively closer to lower heater 60 (when downfeed handle 40 is disposed within muffle 20) than second zone 42.

Figure 3:
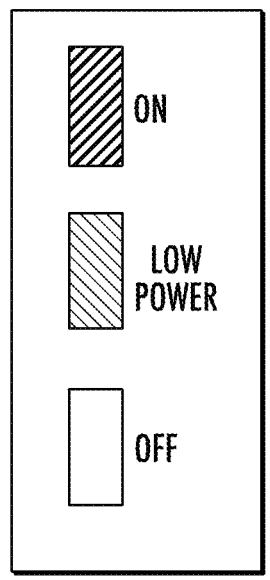
FIG. 3 is a schematic diagram illustrating the draw furnace assembly of FIGS. 1 and 2 in another position.
Figure 3:
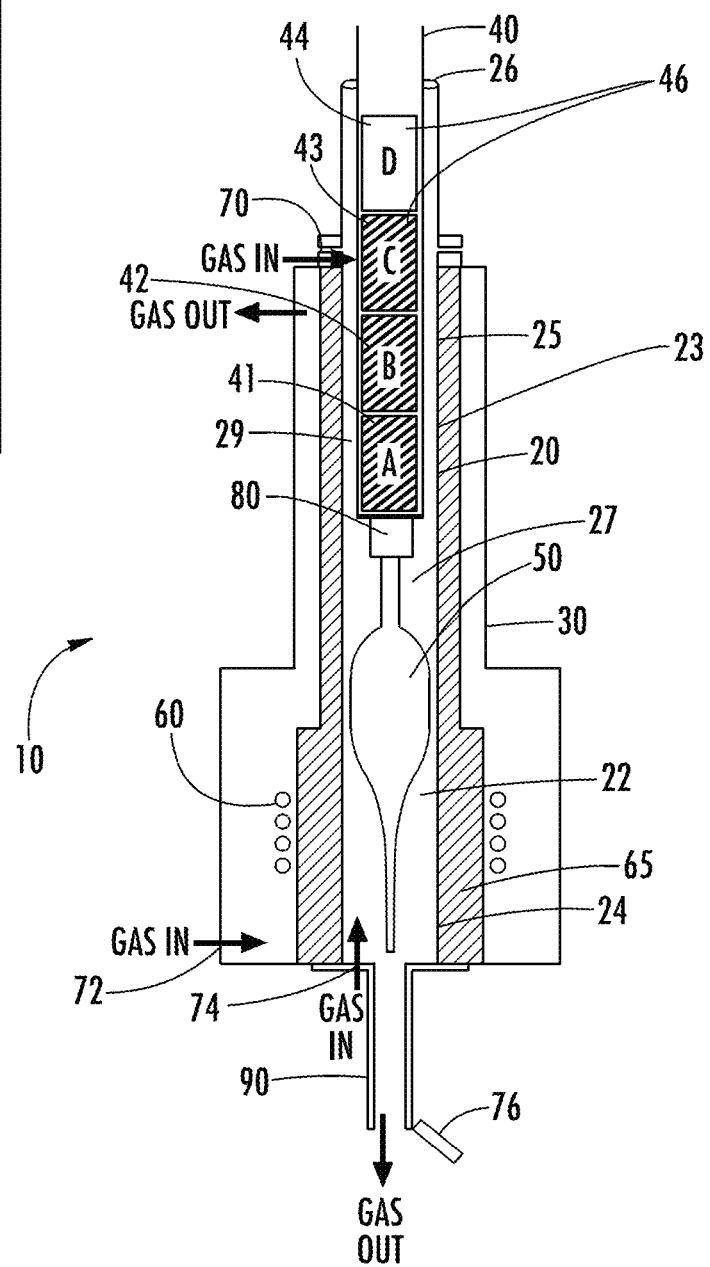

Downfeed handle 40 may then move from the third position to a fourth position by moving lower (e.g., relatively closer to lower heater 60) such that first zone 41, second zone 42, and third zones 43 are each disposed, at least in part, within upper muffle extension 23. At this time, third zone 43 may now be heated. Therefore, third zone 43 is heated after heating first and second zones 41, 42. Downfeed handle 40 may move from the third position to the fourth position simultaneously as additional preform 50 is consumed by the drawing process. At the time of the fourth position of downfeed handle 40, the remaining zone 44 is not heated by heating elements 46 and is disposed, at least in part, exterior of upper muffle extension 23. FIG. 3 depicts the fourth position of downfeed handle 40 in which zones 41, 42, 43 are all heated by heating elements 46. As also shown in FIGS. 1-4, first and second zones 41, 42 are both located relatively closer to lower heater 60 (when downfeed handle 40 is disposed within muffle 20) than third zone 43.

Figure 4:
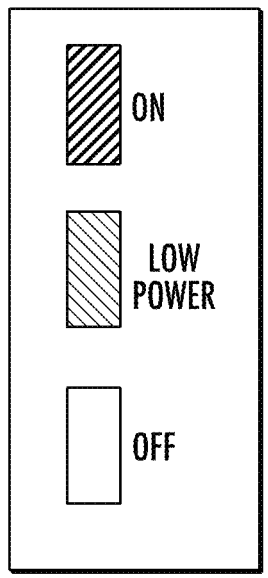
FIG. 4 is a schematic diagram illustrating the draw furnace assembly of FIGS. 1-3 in another position.
Figure 4:
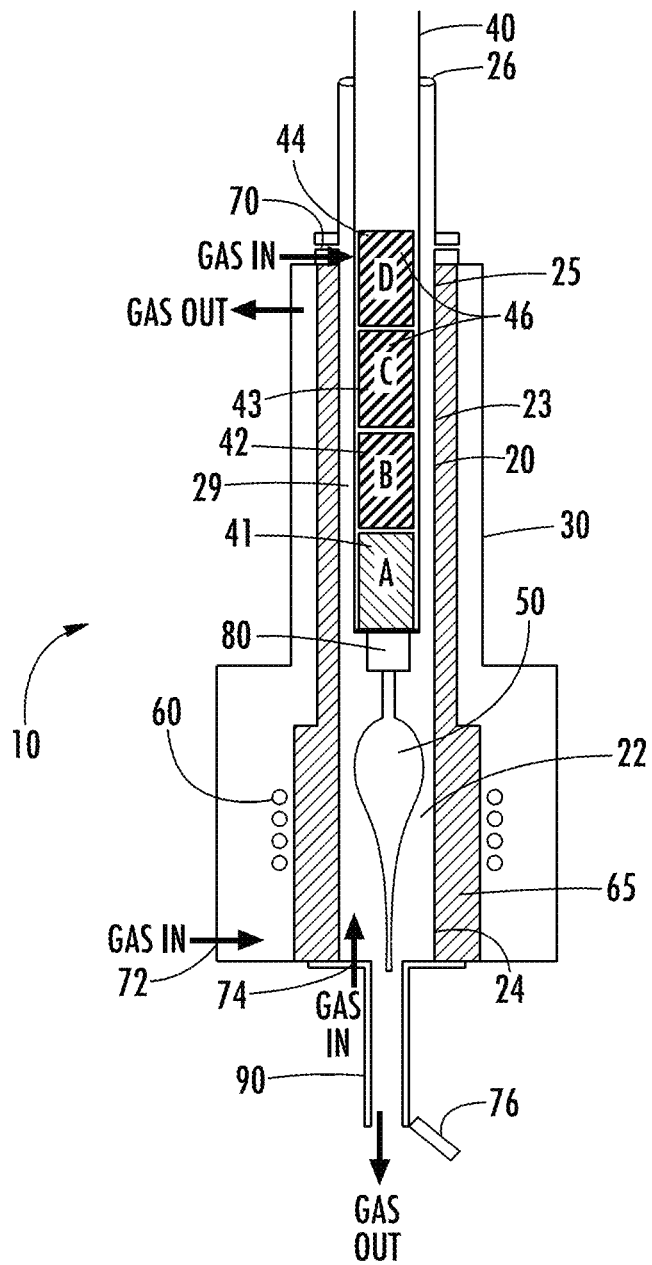

Downfeed handle 40 may then move from the fourth position to a fifth position by moving lower (e.g., relatively closer to lower heater 60) such that first zone 41, second zone 42, third zone 43, and fourth zone 44 are each disposed, at least in part, within upper muffle extension 23. At this time, fourth zone 44 may now be heated. Therefore, fourth zone 44 is heated after heating first, second, and third zones 41, 42, 43. Downfeed handle 40 may move from the fourth position to the fifth position simultaneously as additional preform 50 is consumed by the drawing process. FIG. 4 depicts the fifth position of downfeed handle 40 in which zones 41, 42, 43, 44 are all heated by heating elements 46. As shown in FIGS. 1-4, first, second, and third zones 41, 42, 43 are all located relatively closer to lower heater 60 (when downfeed handle 40 is disposed within muffle 20) than fourth zone 44.

Downfeed handle 40 may then move from the fifth position to a predetermined position by moving lower (e.g., relatively closer to lower heater 60) within muffle 20. Downfeed handle 40 may move from the fifth position to the predetermined position simultaneously as additional preform 50 is consumed by the drawing process. In some embodiments, the fifth position may be the predetermined position such that downfeed handle 40 does not need to move in order to go from the fifth position to the predetermined position. The predetermined position may be a position relative to lower heater 60. When downfeed handle 40 is in the predetermined position, as shown in FIG. 4, the power of one or more heating elements 46 corresponding to first zone 41 may be reduced. For example, the power of the one or more heating elements 46 corresponding to first zone 41 may be reduced by about 10%, about 20%, about 30%, about 40%, about 50%, about 60%, about 70%, about 80%, about 90%, or about 100%. When downfeed handle 40 is in the predetermined position and the one or more heating elements 46 corresponding to first zone 41 are reduced, the heating elements 46 corresponding to the remaining zones 42, 43, 44 may be maintained at their power levels. Thus, in some embodiments, the reduced power of first zone 41 may be lower than the power applied to each of second, third, and fourth zones 42, 43, 44.

When downfeed handle 40 is in the predetermined position, the reduction in power to first zone 41 may be compensated for by the proximity of the zone to lower heater 60. For example, heating elements 46 corresponding to first zone 41 may be reduced in power as first zone 41 moves closer to the heat of lower heater 60. Therefore, in some embodiments, the temperature of first zone 41 may not decrease as the power of heating elements 46 is reduced due to the additional heat from lower heater 60.

It is also contemplated that downfeed handle 40 may move in any order between the first, second, third, fourth, fifth, and predetermined positions. Therefore, for example, in some embodiments, downfeed handle 40 may move from the third position to the predetermined position.

In some embodiments, the heating elements 46 corresponding to both first zone 41 and second zone 42 may be reduced in power when downfeed handle 40 is in the predetermined position. It is also contemplated that the heating elements 46 corresponding to first, second, and third zones 41, 42, 43 are reduced in power when downfeed handle 40 is in the predetermined position. In yet other embodiments, all heating elements 46 may be reduced in power when downfeed handle 40 is in the predetermined position.

The heating elements 46 corresponding to one or more of the zones may be reduced in power when downfeed handle 40 is in the predetermined position in order to maintain a desired thermal profile along the length of muffle 20. As more and more preform 50 is consumed by the drawing process and downfeed handle 40 moves closer to lower heater 60, there is a potential risk that the temperature within muffle 20 may increase due to the combined heat from heating elements 46 and lower heater 60. If the temperature within muffle 20 becomes too high, downfeed handle 40 may overheat, which may cause such unwanted side effects such as stretching of the handle. Therefore, the power of one or more of the zones 41, 42, 43, 44 is reduced when downfeed handle 40 reaches the predetermined position in order to prevent such overheating.

Regulating the temperature of one of more of the zones on downfeed handle 40 may also maintain the temperature of upper muffle extension 23 such that the Grashof number of draw furnace 10 is maintained below a critical value required for steady convection. For example, the Grashof number may be maintained within the range of about 800 to about 1200.

As discussed above, heating elements 46 are coupled to downfeed handle 40 to reduce flow instabilities in the process gas, thus allowing such gases as nitrogen and argon to be used. Additionally, by creating the heating zones, overheating of downfeed handle 40 may be prevented. The different heating zones may also help to better regulate temperature within muffle 20, allowing, for example, relatively lower temperature sealing materials to be used. For example, seal 26 may be comprised of relatively lower temperature sealing materials such as silicones, polyurethanes, rubber, or other elastomeric materials.

As also discussed above, heating elements 46 consecutively heat zones 41, 42, 43, 44 once the zones are each disposed, at least in part, within upper muffle extension 23. However, it is also contemplated that each zone is heated when the zone is disposed, at least in part, within top hat 21. Therefore, for example, the second position of downfeed handle 40 may be when first zone 41 is disposed, at least in part, within top hat 21.

Figure 5:
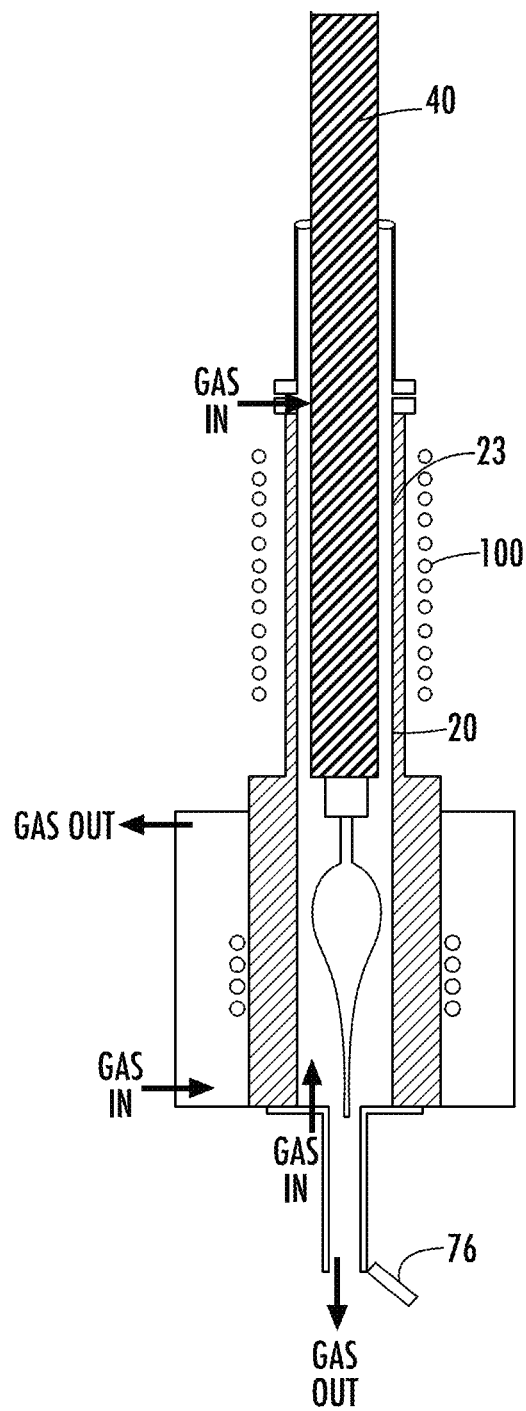
FIG. 5 is a schematic diagram illustrating a draw furnace assembly according to embodiments of the present disclosure.

FIG. 5 depicts another embodiment in which heating elements 46 are replaced with a non-contact heating element(s). In this embodiment, for example, induction heating provides non-contact heating to heat zones 41, 42, 43, 44. As shown in FIG. 5, an induction coil 100 surrounds muffle 20 and generates a magnetic field that couples with downfeed handle 40. The magnetic field passes through the material of upper muffle extension 23 and heats downfeed handle 40. For example, downfeed handle 40 may be comprised of graphite and upper muffle extension 23 may be comprised of quartz in the embodiment of FIG. 5.

FIGS. 6A-13 present results of computational fluid dynamic (CFD) simulations in terms of plots of gas flow and temperature within a furnace assembly (e.g., draw furnace 10). The CFD simulations were validated using historical observations based on current production configurations to confirm their validity.

Figure 6A:
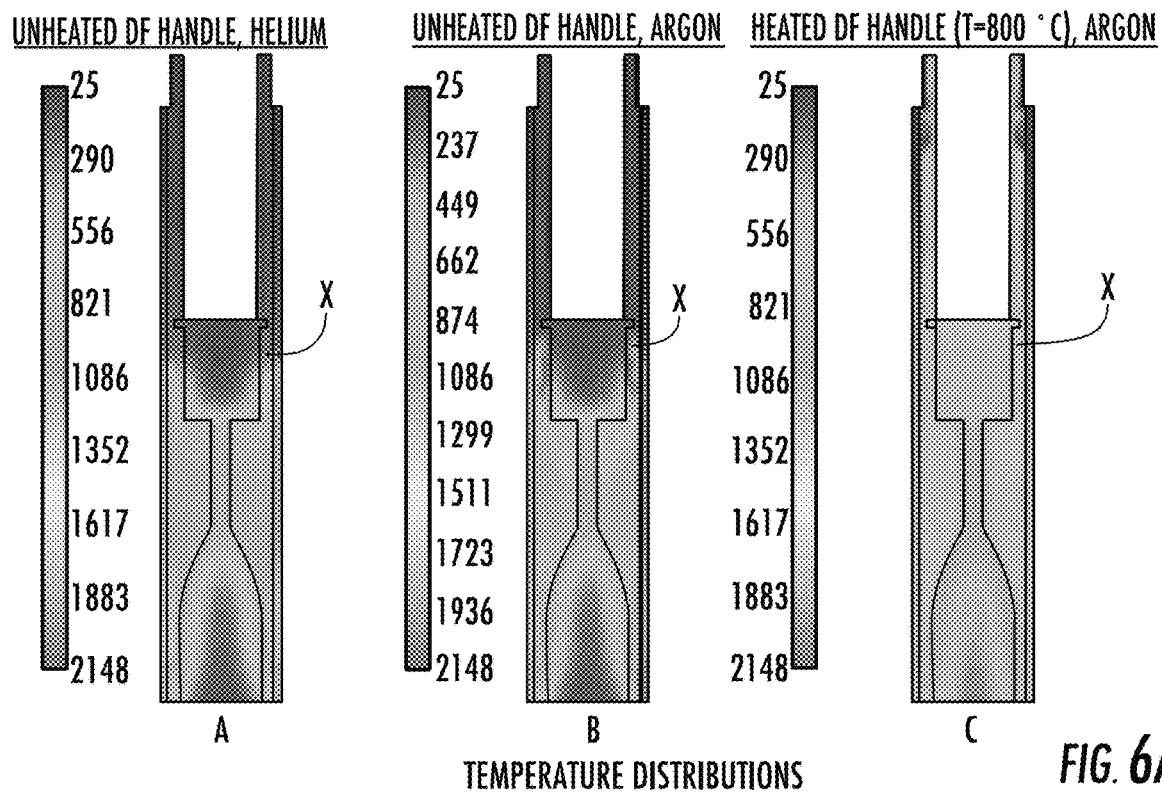
FIG. 6A illustrates temperature contour plots of the draw furnace assembly according to embodiments of the present disclosure and of comparative draw furnace assemblies.
Figure 6B:
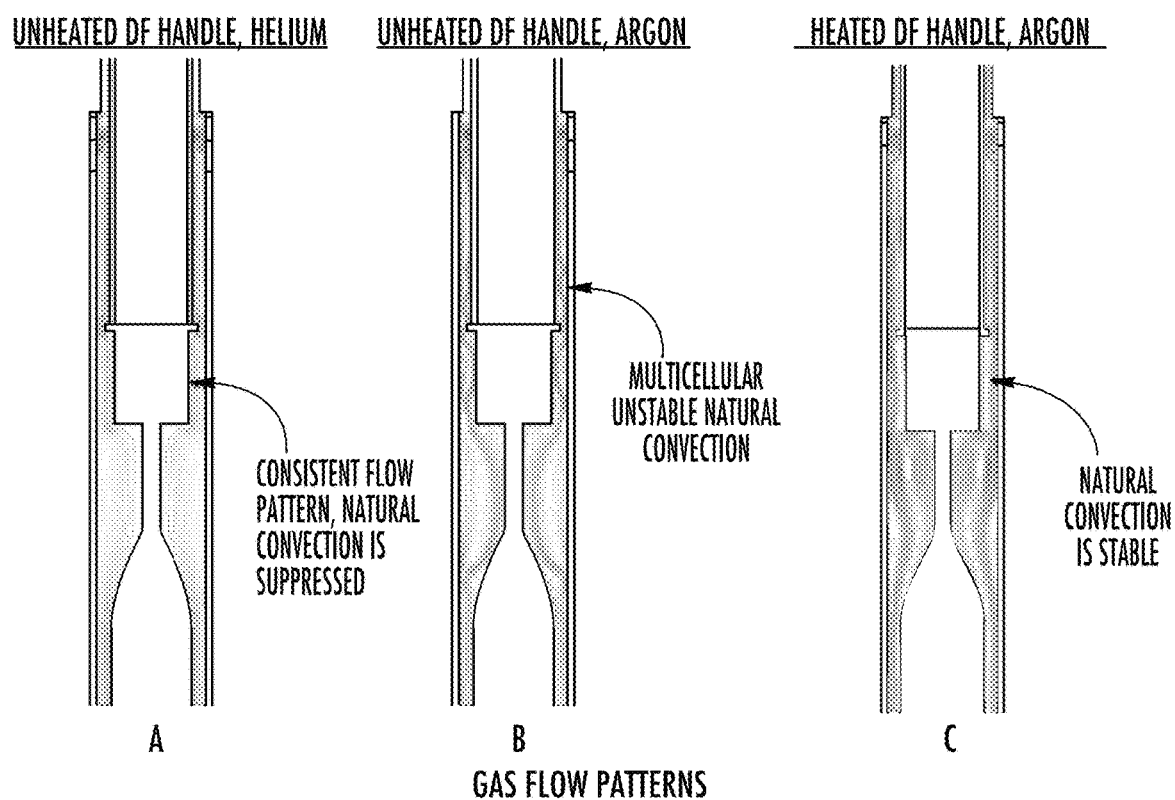
FIG. 6B illustrates stream function contour plots of the gas in the draw furnace assembly according to embodiments of the present disclosure and of comparative draw furnace assemblies. Closed lines of stream function indicate cellular flow.

Referring to FIGS. 6A and 6B, depicted are CFD models showing temperature distributions and gas flow patterns for three examples during a drawing procedure. Specifically, Comparative Example A shows a model of an unheated handle with helium as the process gas, Comparative Example B shows a model of an unheated handle with argon as the process gas, and Example C shows a model of a heated handle with argon as the process gas. In all three examples, a downfeed handle was used with an outer diameter of 4.87 inches and an inner diameter of 4.49 inches. Additionally, for Example C, the downfeed handle was heated to about 800° C. using heating elements 46 and insulation with a thickness of 2.565 inches was added to the exterior wall of the upper muffle extension for a length of 47 inches.

As shown in FIG. 6A, a comparison of Comparative Examples A and B with Example C shows that the purge gas of Example C has a higher temperature in the annular space between the downfeed handle and the upper muffle extension (e.g., area X). For example, the purge gas in the annular space of Comparative Examples A and B has a temperature of about 75-100° C. Conversely, the purge gas in the annular space of Example C has a temperature of about 600° C. The increased temperature of Example C is due to the heating elements on the downfeed handle.

As shown in FIG. 6B, in Comparative Example B, which uses an unheated downfeed handle and argon as the process gas, a multi-cellular buoyancy-driven flow pattern is established in the annular space in an upper portion of the furnace. More specifically, the flow of the process gas is unstable and time variant, resulting in temperature and pressure fluctuations within the annular space. Comparative Example A, which uses helium as the process gas, has consistent gas flow with only two small recirculation vortices formed near the inlet of the gas due to the gas entering the furnace perpendicular to the wall. Thus, Comparative Example A provides a stable, time invariant, flow of process gas. Similar to Comparative Example A, Example C also provides a stable flow of process gas. However, Example C is able to achieve the stable flow when using argon as the process gas by heating the downfeed handle. More specifically, FIG. 6B shows that the buoyant flow of Example C is stable and temperature fluctuations are suppressed.

Figure 7:
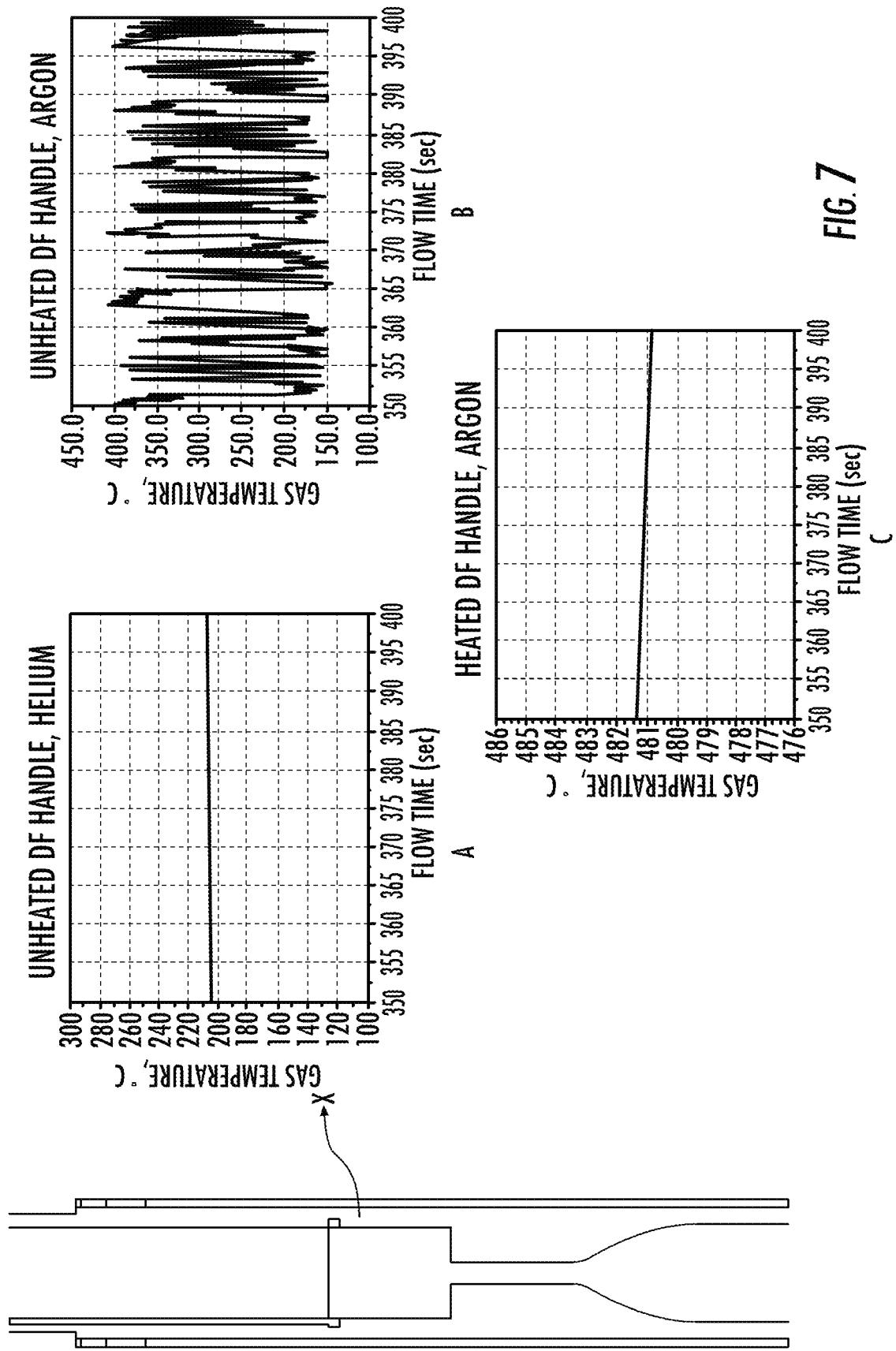
FIG. 7 illustrates plots of temperature vs. time in the upper portion of the draw furnace assembly according to embodiments of the present disclosure and of comparative draw furnace assemblies.

FIG. 7 shows a plot of gas temperature as a function of time at location X for Comparative Examples A and B and Example C. As discussed above, Comparative Example A, which uses helium as the process gas, has a relatively stable temperature plot. Similarly, Example C, which uses a heated downfeed handle and argon as the process gas, has a relatively stable temperature plot. However, Comparative Example B, which uses an unheated downfeed handle and argon as the process gas, has a relatively unstable temperature plot. Comparative Example B has a large temperature fluctuation ranging from about 150-400° C.

Figure 8:
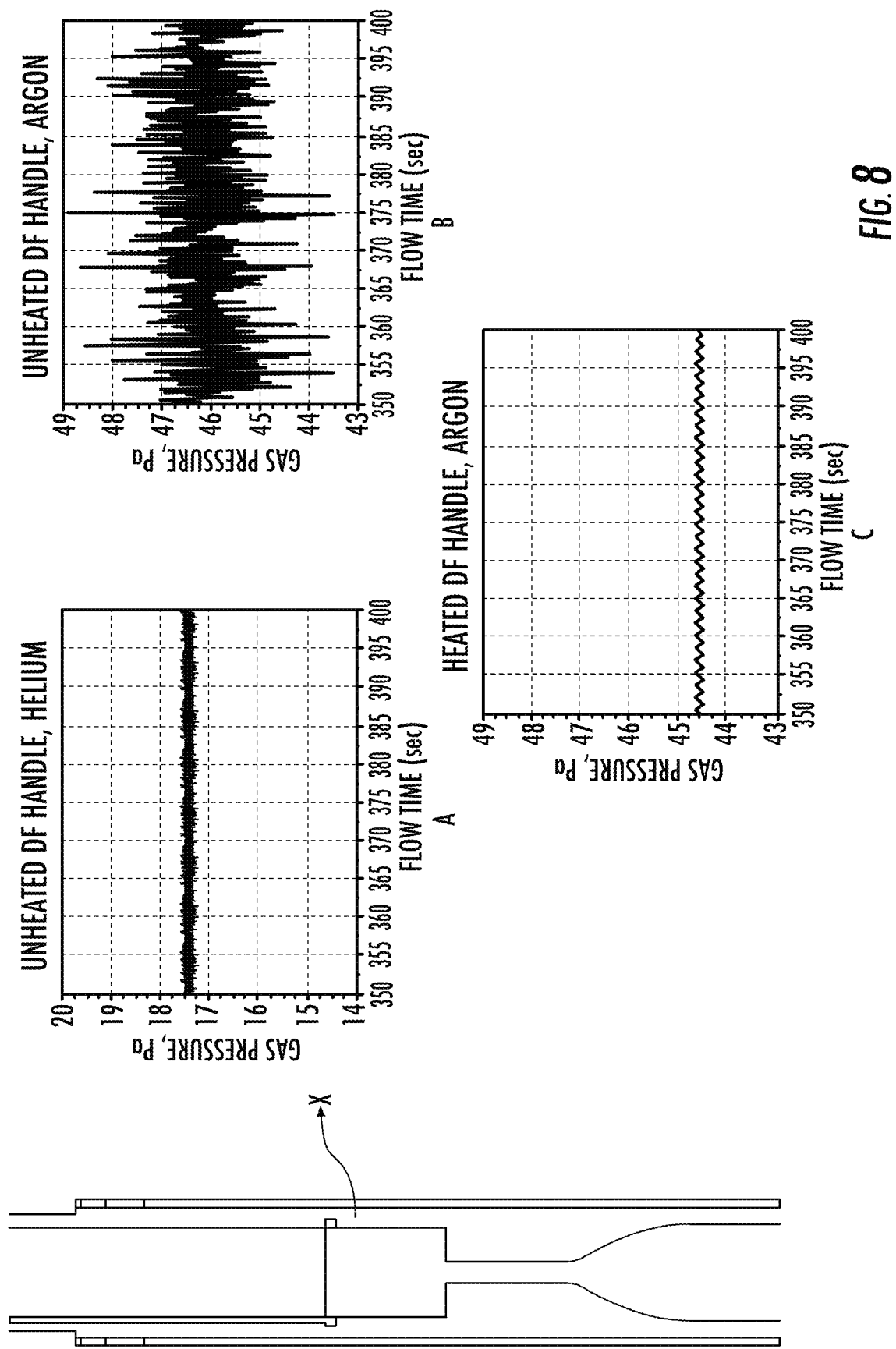
FIG. 8 illustrates plots of gas pressure vs. time in the upper portion of the draw furnace assembly according to embodiments of the present disclosure and of comparative draw furnace assemblies.

FIG. 8 shows a plot of gas pressure as a function of time at location X for Comparative Examples A and B and Example C. Similar to the temperature plots discussed above, Comparative Example A and Example C have relatively stable gas pressures at location X. Conversely, Comparative Example B has a relatively unstable gas pressure at location X.

Figure 9:
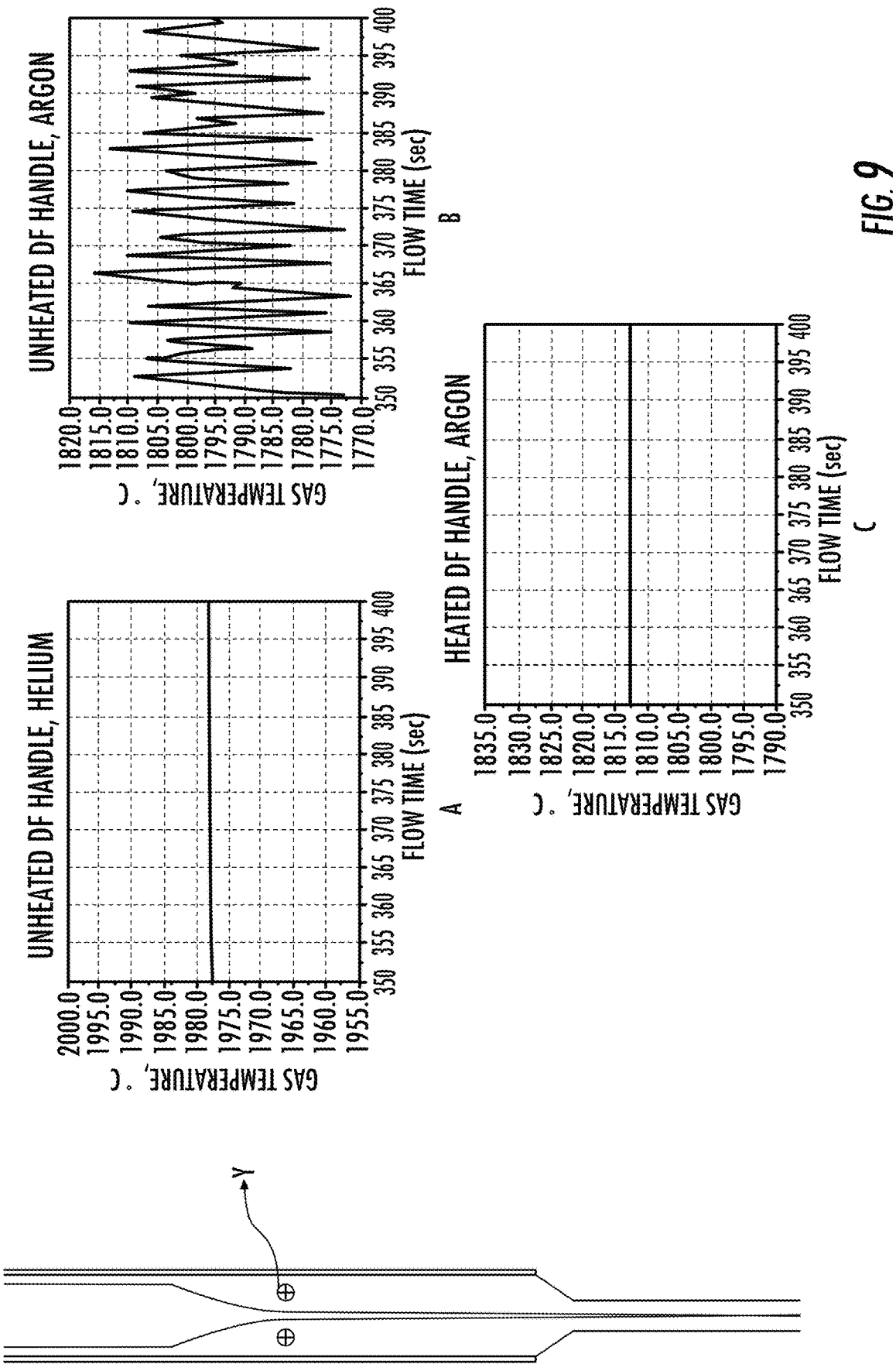
FIG. 9 illustrates plots of temperature vs. time in the neckdown region of the preform within the draw furnace assembly according to embodiments of the present disclosure and of comparative draw furnace assemblies.

As discussed above, the temperature and gas fluctuations near upper muffle extension 23 can be propagated downward within muffle 20 to the neckdown region of preform 50. FIG. 9 shows a plot of gas temperature as a function of time at location Y (near the neckdown region of preform 50) for Comparative Examples A and B and Example C. Due to the use of helium and a heated downfeed handle, respectively, Comparative Example A and Example C have relatively stable non-fluctuating temperature plots. Comparative Example B again has a relatively unstable temperature plot, with temperatures fluctuating from about 1771° C. to about 1816° C. over a 50 second interval.

Figure 10:
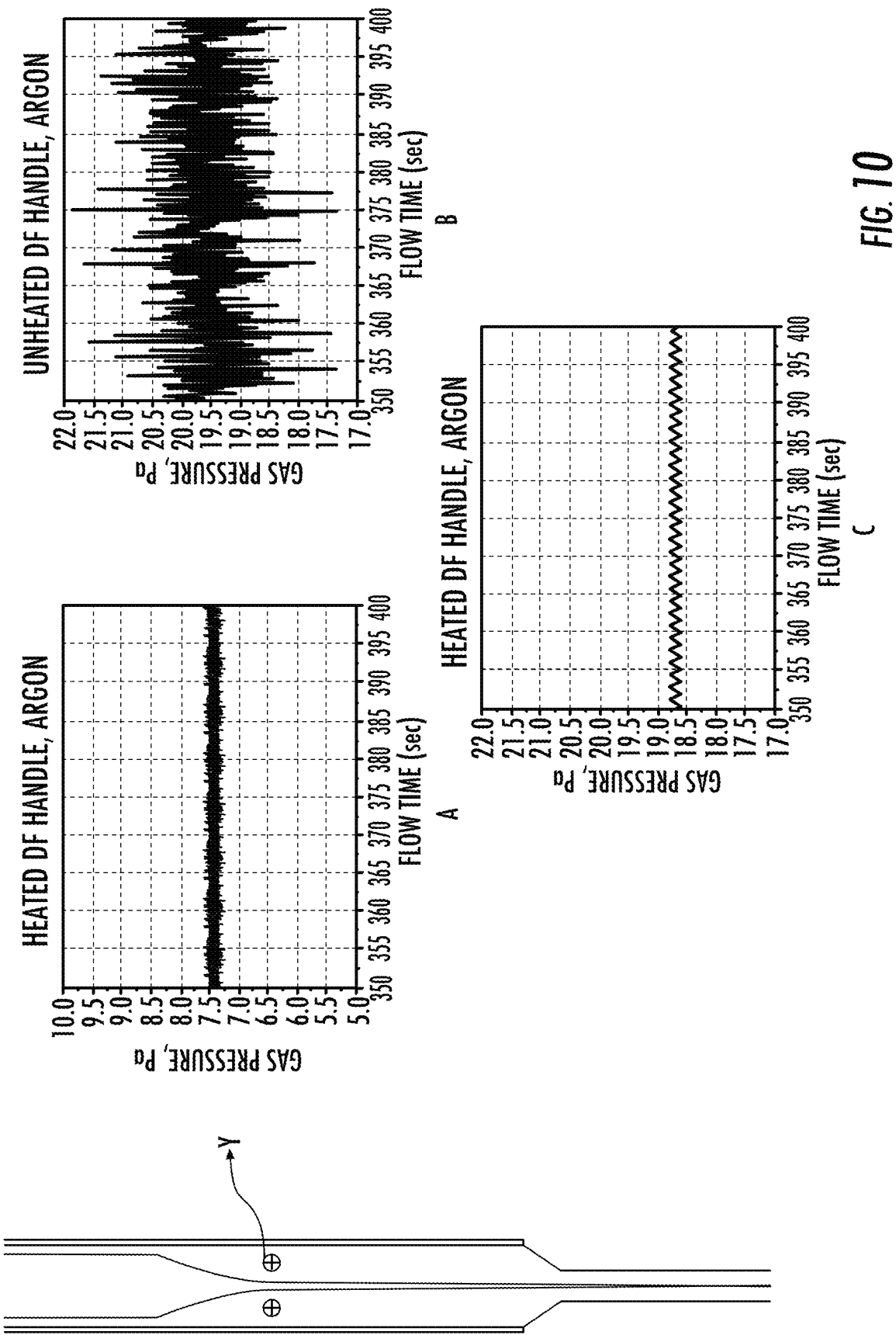
FIG. 10 illustrates plots of gas pressure vs. time in the neckdown region of the preform within the draw furnace assembly according to embodiments of the present disclosure and of comparative draw furnace assemblies.

FIG. 10 shows a plot of gas pressure as a function of time at location Y for Comparative Examples A and B and Example C. Similar to FIG. 8, Comparative Example A and Example C have relatively stable gas pressures, while Comparative Example B has a fluctuating gas pressure.

Figure 11:
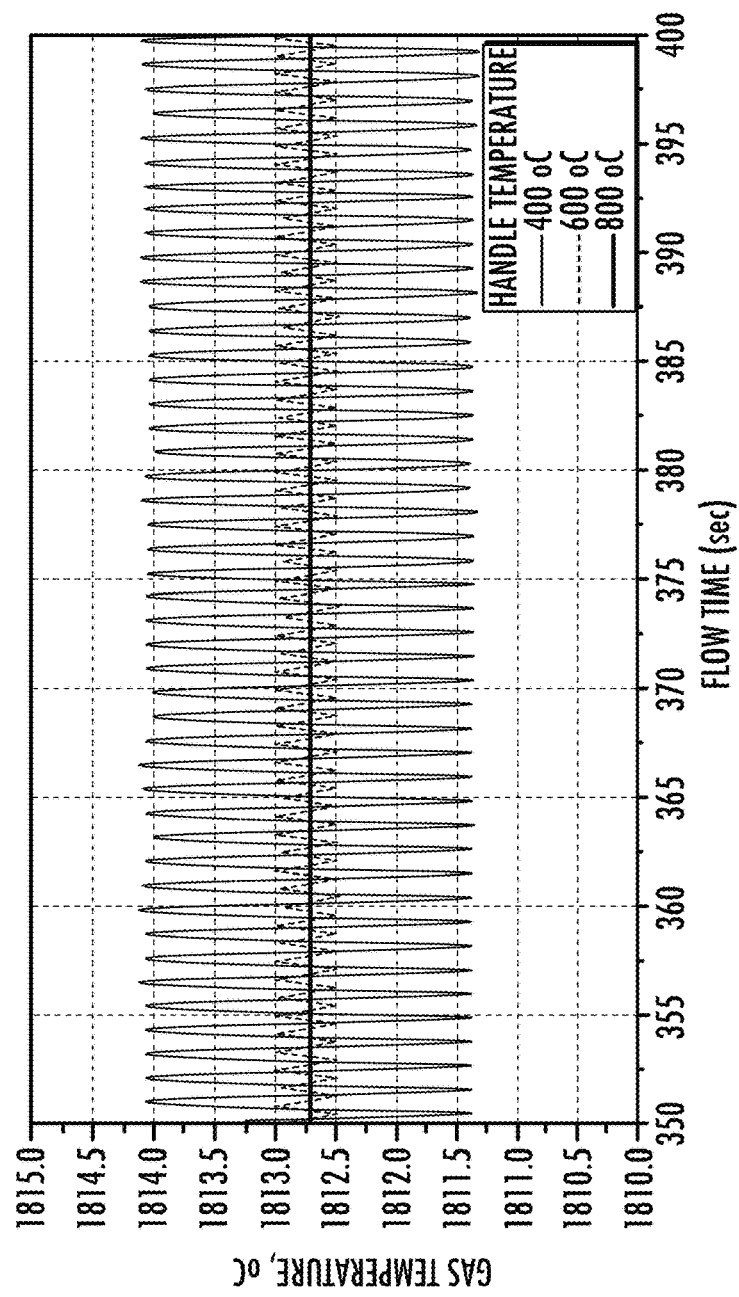
FIG. 11 illustrates a plot of temperature vs. time in the neckdown region of the preform for draw furnace assemblies heated to different temperatures.
Figure 11:
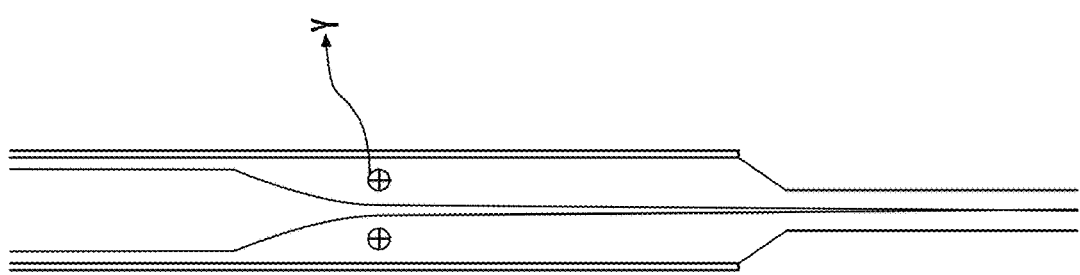

FIG. 11 shows a plot of temperature as a function of time at location Y for three different heat rates of downfeed handle 40. More specifically, a first downfeed handle was heated to a temperature of about 400° C., a second downfeed handle was heated to a temperature of about 600° C., and a third downfeed handle was heated to a temperature of about 800° C. The first downfeed handle temperature produced the most temperature fluctuations at location Y, and the third downfeed handle temperature produced the least temperature fluctuations at location Y. Therefore, heating a downfeed handle to 800° C. produces a more stable temperature at location Y (near the neckdown region of preform 50) of a muffle compared with heating the downfeed handle to a temperature of 600° C. and to a temperature of 400° C.

Figure 12:
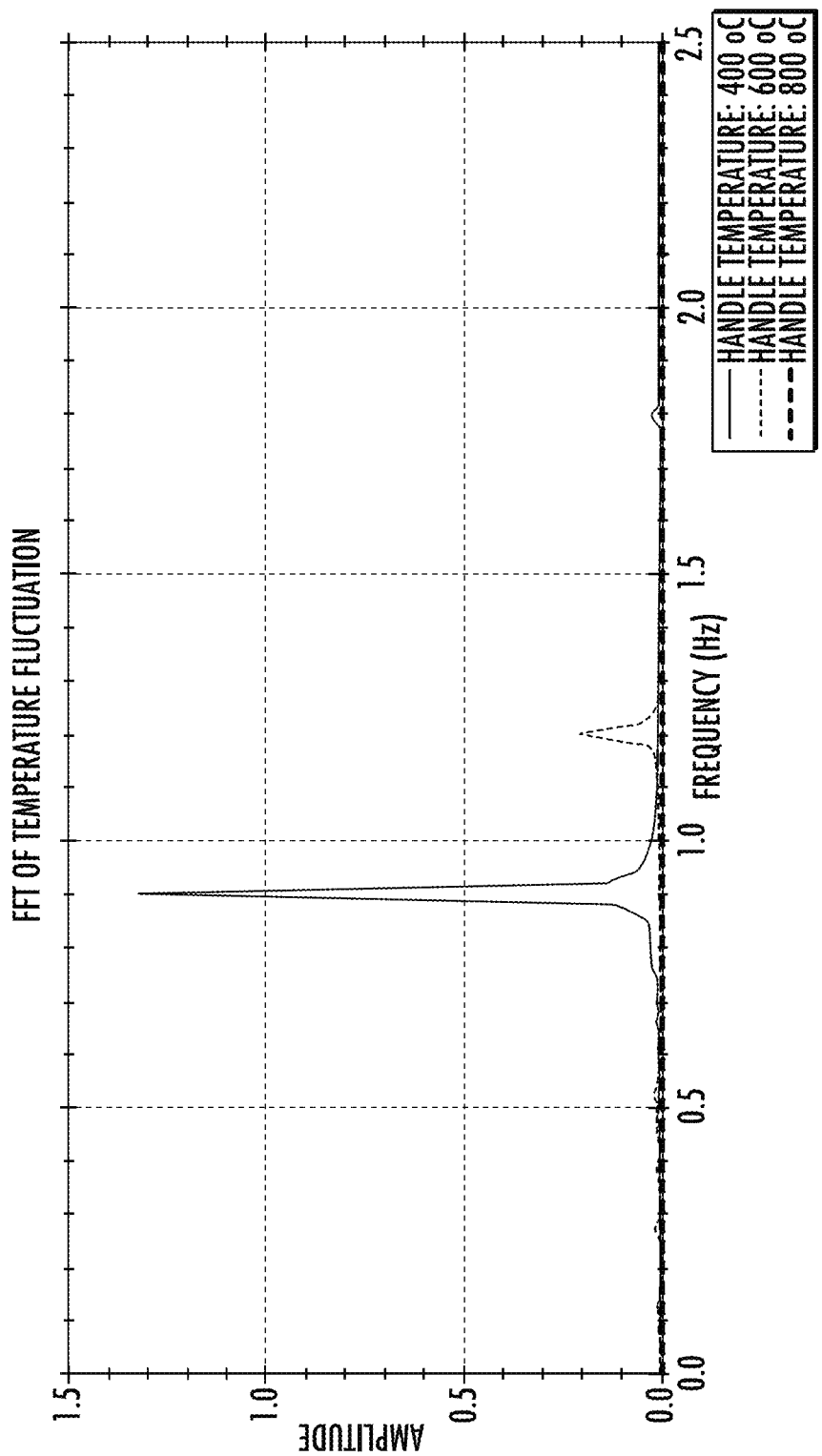
FIG. 12 illustrates a plot of amplitude vs. frequency in the neckdown region of the preform for the draw furnace assemblies of FIG. 11.

An FFT (Fast Fourier Transform) analysis of the data of FIG. 11 is shown in FIG. 12. As shown in FIG. 12, the amplitude of the temperature fluctuation decreases with increasing temperature of the downfeed handle. FIG. 12 shows that the fluctuation is significantly suppressed when the temperature of the downfeed handle approaches about 800° C.

Figure 13:
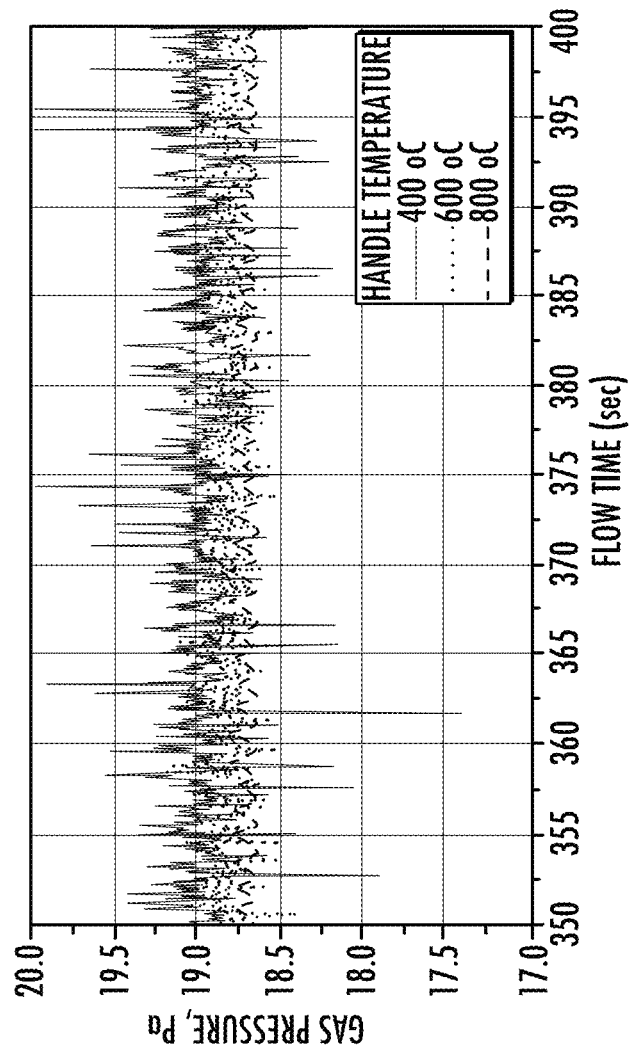
FIG. 13 illustrates a plot of gas pressure vs. time in the neckdown region of the preform for draw furnace assemblies heated to different temperatures.
Figure 13:
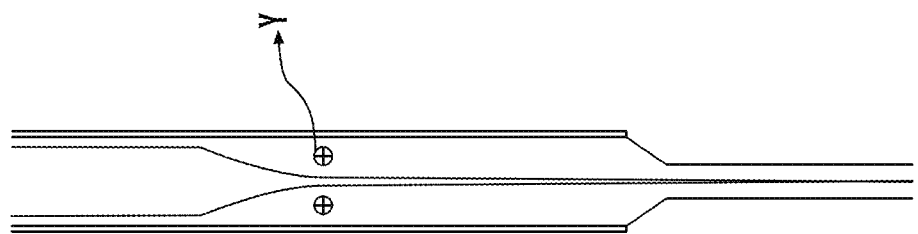

Similar to the plots of temperature vs. time, gas pressure fluctuations at location Y are also relatively more stable with a temperature of the downfeed handle approaching about 800° C. FIG. 13 shows a plot of gas pressure as a function of time at location Y for the three downfeed handle temperatures: the first downfeed handle heated to a temperature of about 400° C., the second downfeed handle heated to a temperature of about 600° C., and the third downfeed handle heated to a temperature of about 800° C. The first downfeed handle temperature produced the most gas pressure fluctuations at location Y, and the third downfeed handle temperature produced the least gas pressure fluctuations at location Y. Therefore, heating a downfeed handle to 800° C. produces a more stable gas pressure at location Y (near the neckdown region of preform 50) of a muffle compared with heating the downfeed handle to a temperature of 600° C. and to a temperature of 400° C.

As discussed above, the optical fiber draw furnace disclosed herein advantageously allows process gases with lower kinematic viscosity (such as nitrogen or argon) to be used while still providing a drawn optical fiber with a constant and uniform diameter.

What is claimed is:

1. A method of operating an optical fiber draw furnace, the method comprising:
   positioning a downfeed handle for supporting an optical fiber preform within a furnace such that the downfeed handle is movable within the furnace; and
   operating one or more heating elements to thermally heat at least a portion of an upper muffle extension disposed within the furnace, the one or more heating elements being moveable with the downfeed handle,
   wherein operating the one or more heating elements comprises heating at least a portion of the downfeed handle to a temperature ranging from about 400° C. to about 1000° C.

2. The method of claim 1, further comprising injecting a process gas around the downfeed handle.

3. The method of claim 2, wherein the process gas is at least one of nitrogen and argon.

4. The method of claim 1, further comprising operating a lower heater within the furnace, the upper muffle extension being disposed above the lower heater within the furnace.

5. The method of claim 1, wherein operating the one or more heating elements comprises heating the downfeed handle such that only a portion of the downfeed handle that is disposed within the upper muffle extension is heated.

6. The method of claim 1, wherein operating the one or more heating elements comprises heating at least the portion of the downfeed handle to a temperature of about 800° C.

7. The method of claim 1, wherein operating the one or more heating elements comprises sequentially heating a plurality of zones of the downfeed handle.

8. The method of claim 7, wherein:
   the plurality of zones comprises a first zone that is disposed closest to a lower heater of all the zones of the plurality of zones, and
   sequentially heating the plurality of zones comprises heating the first zone after moving the downfeed handle relatively closer to the lower heater.

9. The method of claim 8, wherein:
   the plurality of zones further comprises a second zone, the first zone being located relatively closer to the lower heater than the second zone, and
   sequentially heating the plurality of zones comprises heating the second zone after heating the first zone and after moving the downfeed handle relatively closer to the lower heater.

10. The method of claim 9, wherein:
    the plurality of zones further comprises a third zone, the first zone and the second zone being located relatively closer to the lower heater than the third zone, and
    sequentially heating the plurality of zones comprises heating the third zone after heating the first zone and the second zone and after moving the downfeed handle relatively closer to the lower heater.

11. The method of claim 10, further comprising reducing power applied to the first zone after moving the downfeed handle to a predetermined position relative to the lower heater while maintaining the power applied to the second zone and to the third zone.

12. The method of claim 7, wherein sequentially heating the plurality of zones comprises heating one or more additional zones as the downfeed handle moves relatively closer to a lower heater.

13. The method of claim 12, wherein sequentially heating the plurality of zones further comprises reducing power applied to at least one zone when the downfeed handle moves to a predetermined position relative to the lower heater.

14. The method of claim 1, further comprising:
    supporting an optical fiber preform from the downfeed handle, and
    drawing an optical fiber from the optical fiber preform.

15. The method of claim 1, wherein the one or more heating elements are coupled to the downfeed handle.

16. The method of claim 15, wherein the one or more heating elements are disposed on the downfeed handle.

* * * * *